(12) United States Patent
Golly et al.

(10) Patent No.: US 8,718,955 B2
(45) Date of Patent: May 6, 2014

(54) SYSTEM AND METHOD FOR DETECTING BLOCKED PITOT-STATIC PORTS

(75) Inventors: Timothy T. Golly, Lakeville, MN (US); Jason Debo, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 679 days.

(21) Appl. No.: 12/946,359

(22) Filed: Nov. 15, 2010

(65) Prior Publication Data

US 2012/0123704 A1    May 17, 2012

(51) Int. Cl.
*G01L 7/00* (2006.01)

(52) U.S. Cl.
USPC .......................................................... 702/50

(58) Field of Classification Search
USPC ........... 702/47, 50, 57, 58, 75, 138, 141, 142, 702/183, 185
See application file for complete search history.

(56) References Cited

U.S. PATENT DOCUMENTS

| | | | | |
|---|---|---|---|---|
| 4,763,063 A | * | 8/1988 | Shkedi | 324/685 |
| 5,359,888 A | * | 11/1994 | Hagen | 73/178 R |
| 5,680,109 A | | 10/1997 | Lowe et al. | |
| 6,205,376 B1 | * | 3/2001 | Gordon | 701/4 |
| 6,253,166 B1 | * | 6/2001 | Whitmore et al. | 703/2 |
| 2003/0140704 A1 | | 7/2003 | Kurtz et al. | |
| 2007/0150122 A1 | * | 6/2007 | Hongerholt et al. | 701/3 |
| 2007/0280046 A1 | | 12/2007 | Perez | |
| 2010/0100260 A1 | * | 4/2010 | Mcintyre et al. | 701/6 |

FOREIGN PATENT DOCUMENTS

GB    2418739 A    4/2006

OTHER PUBLICATIONS

European Search Report, dated Feb. 15, 2012, for European Patent Application No. 11250882.5.

* cited by examiner

*Primary Examiner* — Mohamed Charioui
(74) *Attorney, Agent, or Firm* — Edwards Wildman Palmer LLP; Scott D. Wofsy; Christopher J. Cillié

(57) ABSTRACT

An avionics system and process for detecting pneumatic blockages having an air pressure measurement system including a first sensor positioned in association with the air inlet of an air probe component. The air pressure measurement system having a second sensor positioned in association with the air inlet for detecting air pressure in which the second sensor has a frequency response higher than that of the first sensor. An air data computer is coupled to each of the first and second sensors being configured and operable to calculate a first aircraft movement measurement using detected air pressure from the first sensor and is further operative to determine if the first sensor is faulty or if the air inlet is blocked in dependence upon the frequency content and amplitude of the output from the second sensor.

17 Claims, 4 Drawing Sheets

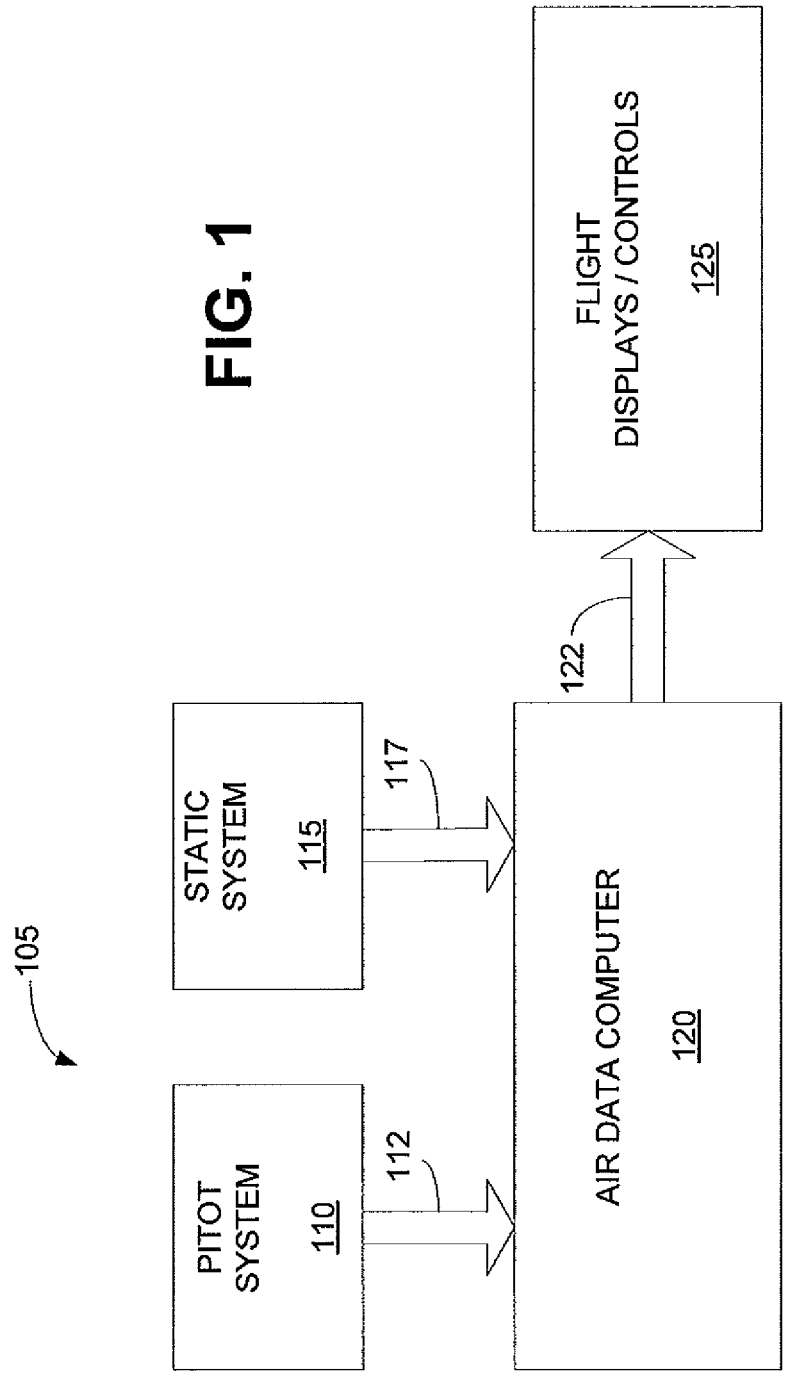

SYSTEM AND METHOD FOR DETECTING BLOCKED PITOT-STATIC PORTS

FIELD OF THE INVENTION

The present invention relates to aviation electronics. More particularly, the present invention relates to methods and apparatus for identifying blocked pitot tubes, static ports, or other pressure ports of the air data system of an aircraft.

BACKGROUND OF THE INVENTION

Aircraft typically include air data systems which are used to determine the longitudinal air speed, and the altitude of the aircraft. Frequently these systems are also used to measure angle of attack, and angle of sideslip. The pitot system includes one or more pitot tubes which project out, of the airframe, into the air stream, and allow the impact pressure of the atmosphere to enter the tube(s). The pitot tube has an opening, generally circular, facing forward. The opening is exposed to rain air pressure while the aircraft is moving through the air. Sensors sense a pressure differential which can be between the impact air pressure from the pitot tube and static air pressure from a static port. The air speed indicative output is provided, typically by an air data computer, to an air speed indicator in the cockpit.

The static system typically includes one or more of the static pressure ports which sense the atmospheric pressure outside of the aircraft, ideally without being influenced by pressure variances caused by movement of the aircraft. Static pressure is an important parameter that is utilized in aircraft for numerous purposes including the determination of altitude, altitude rate, airspeed and airspeed rate, which last-mentioned parameters are, in turn, used as inputs to various other devices such as flight management systems, autopilots, ground proximity warning systems and wind shear detectors. The standard atmospheric pressure sensed by the static ports is used to generate altitude indicative signals which are provided, typically by the air data computer, to an altimeter in the cockpit of the aircraft. Frequently, in newer aircraft, the static ports are integral to the pitot tubes.

Air data probes may also include pressure ports designed to measure angle of attack or angle of sideslip. Sensors sense a pressure differential between pressure ports located on the top and the bottom side of the probe to measure angle of attack. Sideslip can be measured similarly by sensing a pressure differential between ports located on the left and right sides of the probe or can alternately be measured by comparing pressures from a left side probe with that from a right side probe.

The pitot tube(s), static ports, and other associated ports, of an air data system can sometimes develop blockages which seriously affect the accuracy of the sensed pressures, and therefore seriously affect the accuracy of the determined air speed, altitude, or other measured air data parameters. The pitot tubes and static ports can be blocked with foreign materials caused by insects, bird strikes, volcanic ash, icing and other debris for example. Pitot ports are especially vulnerable to blockage because the pitot opening is forward facing and is therefore the most susceptible to icing or ingestion of foreign material.

There is currently no reliable system and method for detecting whether a pitot tube and/or static port is either malfunctioning or is indeed blocked by any of the aforesaid debris. For instance, in regards to a blocked pitot tube and drain hole, current technology relies on sensing a constant (trapped) pressure by comparing with other sources or systems which is unreliable (e.g., a blockage may have no impact on the measured pressures if it occurs while the aircraft is at a constant airspeed & altitude). Thus, multiple common mode failures may make it difficult or impossible to determine which, if any, systems are still operating correctly. Further, current technology cannot distinguish between a blocked port and a problem associated with the pressure sensor and may also incorrectly vote out a properly functioning pressure measurement if two or more channels are in error by approximately the same amount.

SUMMARY OF THE INVENTION

In one aspect, an avionics system and process for detecting pneumatic blockages is described in which an aspect of the invention includes an air pressure measurement system including a first sensor positioned in association with an air inlet of an air probe component for detecting air pressure. The air pressure measurement system further includes a second sensor positioned in association with the air inlet of the air probe component for detecting air pressure, the second sensor having a frequency response higher than the frequency response of the first sensor. An air data computer is coupled to each of the first and second sensors and is configured and operable to calculate a first aircraft movement measurement using the detected air pressure from the first sensor and is further operative to determine if the first sensor is faulty or if the air inlet of the air probe component is blocked in dependence upon the frequency content and amplitude of the output from the second sensor.

In a further aspect of the invention, an avionics system comprises an air pressure measurement system including an air probe component coupled to an electronic pressure sensor. The electronic sensor is configured and operable to provide a first electrical signal indicative of an air pressure measurement from the air probe component and a second electrical signal also indicative of an air pressure measurement from the air probe component wherein the frequency response of the second electrical signal is higher than the frequency response of the first electrical signal. An air data computer is coupled to each of the first and second electrical signals wherein the air data computer is configured and operable to calculate an aircraft movement measurement using the first electrical signal and to determine if the air probe component is blocked by ice or other debris in dependence upon the frequency content and amplitude of the second electrical signal. It is to be appreciated and understood the first sensor is preferably designed to provide a stable measurement of the pressure being monitored, and the second sensor is preferably designed to quantify the amount of turbulence or other noise in the airflow. This turbulence is comprised of naturally occurring turbulence in the air, turbulence in the airflow over the airframe, and turbulence caused by the airflow in and around the probe. A blocked port may not necessarily cause any shift in the measured pressure from the first sensor but should exhibit virtually no indication of turbulence or other noise from the second sensor.

In a further aspect of the invention, the air data computer is configured and operable to use the aforesaid second electrical signal to calculate a second aircraft movement measurement different than the aforesaid first aircraft movement measurement.

BRIEF DESCRIPTION OF THE DRAWINGS

The objects and features of the invention can be understood with reference to the following detailed description of an illustrative embodiment of the present invention taken together in conjunction with the accompanying drawings in which:

FIG. 1 is a block diagram illustrating a pitot-static monitor system in accordance with embodiments of the invention;

WRITTEN DESCRIPTION OF CERTAIN EMBODIMENTS OF THE INVENTION

Figure 2A:
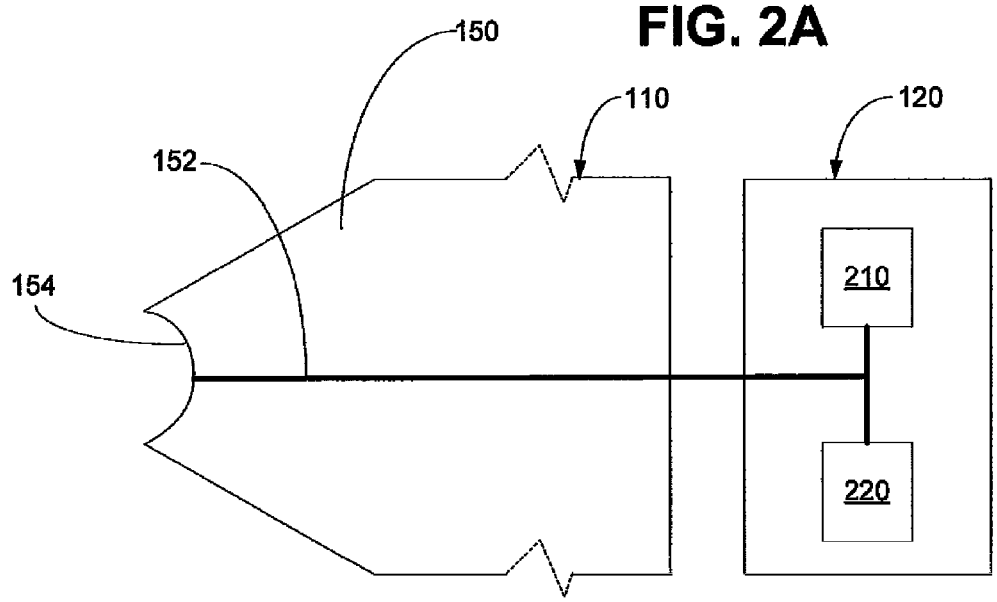
FIG. 2A and FIG. 2B are block diagrams of portions of the pitot-static monitor system shown in FIG. 1.

The present invention is now described more fully with reference to the accompanying drawings, in which an illustrated embodiment of the present invention is shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

The subject invention, and as discussed below with reference to the illustrated embodiments, is directed to a new and useful system and process for augmenting a primary air data pressure sensor in an air data probe component (such as a pitot tube or static port, but not limited thereto) with a secondary pressure sensor, which secondary pressure sensor has a higher dynamic signal detection range than the primary sensor for the aforesaid air data probe. A aircraft air data computer analyzes turbulence or noise present in the detected signal of the secondary sensor having the higher dynamic signal range to determine if a pitot tube or static port is either malfunctioning or a pneumatic blockage has occurred in an air data probe component. Additional to detecting the operating and blockage status of an air data probe, the detected signal of the secondary sensor having a higher dynamic signal range may also be utilized by an aircraft computer system for determining aircraft movement calculations which require a higher frequency response than is typical (such as, but not limited to, enabling proper measurement for input to gust load alleviation systems and in statically unstable aircraft having closed loop flight control systems). It is to be appreciated the aforesaid frequency response is only to be understood to be exemplary in accordance with description of an illustrated embodiment of the invention and thus is not to be understood to be limited thereto. Still further, the aforesaid secondary sensor may be utilized by the aircraft computer system for providing a backup sensor for determining aircraft movement calculations in the event of malfunction or failure of the primary sensor for an air data probe component.

With reference now to the illustrated embodiment of FIG. 1, shown is a block diagram of avionics system 100 adapted to provide pitot-static monitoring in accordance with the present invention. System 100 utilizes numerous conventional components of avionics systems, which are adapted to implement the methods of the present invention. System 100 includes pitot-static system 105 coupled to an air data computer 120 which is coupled to a flight displays/controls 125. It is to be appreciated that the embodiment of avionics system 100 shown in FIG. 1 is provided for illustrative purposes only and it is not to be understood to be limited thereto. For instance, it is to be understood and appreciated pitot-static system 105 may include any number and combination of pitot probe 110, static port 115, or other air data probe components for determining measurement such as angle of attack, angle of sideslip, amongst other measurements.

As to be discussed further below, pitot-static system 105 preferably includes a pitot system 110 having one or more pitot tubes which can be blocked. Pitot system 110 provides output 112 to air data computer 120. Output 112 can be pneumatic pressure, electrical signals or other types of output which are indicative of pressure sensed by the pitot tube(s), and thereby typically indicative of the air speed of the aircraft in which system 100 is installed.

As also discussed further below, static system 115 preferably includes static pressure ports which sense the atmospheric pressure outside of the aircraft. Static system 115 provides output 117, to air data computer 120, which is typically indicative of the altitude of the aircraft. As with output 112 of pitot system 110, output 117 of static system 115 can include pressure, electrical signals, or other outputs indicative of the pressures sensed by static system 115 or of the altitude of the aircraft. While outputs 112 and 117 are illustrated as being coupled to an air data computer, in other embodiments, these outputs may also be provided directly to altimeters and air speed indicators. In the embodiment illustrated, air data computer 120 provides air speed and altitude data 122 to flight displays/controls 125. Flight displays/controls 125 typically display to the pilot of the aircraft the altitude and air speed information. Also, flight displays/controls 125 can automatically control aspects of the aircraft operation based upon the air speed and altitude data 122.

With reference now to FIG. 2A (and with continuing reference to FIG. 1), shown is pitot system 110 preferably illustrated as a conventional pilot tube component 150, which preferably projects out of the airframe and into the air stream so to allow the impact pressure of the atmosphere to enter a pilot tube 152. The pitot tube 152 typically has an opening 154, generally circular, facing forward. The opening 154 is exposed to ram air pressure while the aircraft is moving through the air. It is to be appreciated the present invention may be utilized with various types and configurations of pitot systems 110 wherein the pitot system illustrated in FIG. 2A is provided for illustrative purposes only.

In accordance with an illustrated embodiment of the present invention, pitot tube 152 of pitot tube component 150 is shown coupled to a primary 210 and secondary pressure sensor 220 preferably in the air data computer 120. In the illustrated embodiment, the primary pressure sensor 210 is to be understood to be configured and operable to provide a conventional frequency response range for detecting ram air pressure from pitot tube 152, which in turn is preferably used by air data computer 120 to typically determine airspeed. It is also to be appreciated that the primary pressure sensor 210 is configured and operable to reject high frequency noise preferably by either analog filtering and/or subsequent digital filtering primarily for providing accurate measurements. With regards to the secondary pressure sensor 220, it is preferably configured and operable to provide a frequency response signal range which is higher than that of the aforesaid primary pressure sensor 210 which signal is preferably used by air data computer 120 to determine if pitot tube 152 (including a drain hole of pilot system 110) becomes blocked by ice or other debris matter, as well as to calculate other determinations as to be described below with reference to FIG. 3.

Figure 2B:
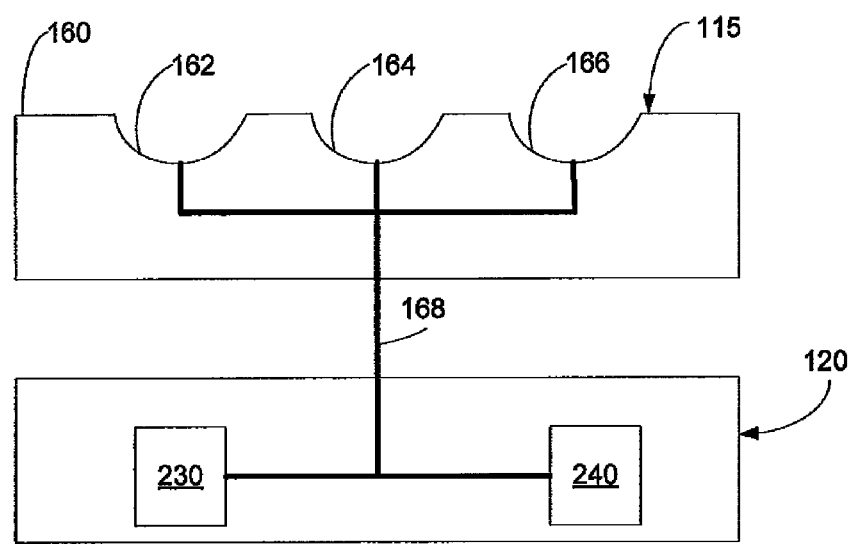

Referring now to FIG. 2B (and with continuing reference to FIG. 1), shown is static system 115 preferably illustrated as a conventional static pressure port component 160 mounted flush with an airframe. The static pressure port component 160 is configured and operable to sense the atmospheric pressure outside of the aircraft, ideally without being influenced by pressure variances caused by movement of the aircraft. Static pressure present on the airframe is preferably provided by a plurality of static ports 162-166, via a manifold and tubing 168, to primary 230 and secondary 240 static pressure sensors. As noted above, static pressure is an important parameter that is utilized in aircraft for numerous purposes including the determination of altitude, altitude rate, airspeed and airspeed rate, amongst other determinations. Typically, the standard atmospheric pressure sensed by the static ports 162-166 is used to generate altitude indicative signals by the air data computer 120 which are provided, typically by the air data computer 120, to an altimeter in the cockpit of the aircraft.

Similar to the aforesaid illustrated embodiment of the pitot system 110, the primary pressure sensor 230 of the static pressure port component 160 is to be understood to be configured and operable to provide a conventional frequency response range for detecting atmospheric pressure from static pressure port component 160, which in turn is preferably used by air data computer 120 to typically determine altitude indicative signals. It is also to be appreciated that the primary pressure sensor 230 is configured and operable to reject high frequency noise preferably by either analog filtering and/or subsequent digital filtering primarily for providing accurate measurements. With regards to the secondary pressure sensor 240, it is preferably configured and operable to provide a frequency response signal range which is higher than that of the aforesaid primary pressure sensor 230 which signal is preferably used by air data computer 120 to determine if static pressure port component 160 becomes blocked by ice or other debris matter, as well as to calculate other determinations as to be described below with reference to FIG. 3.

Figure 3:
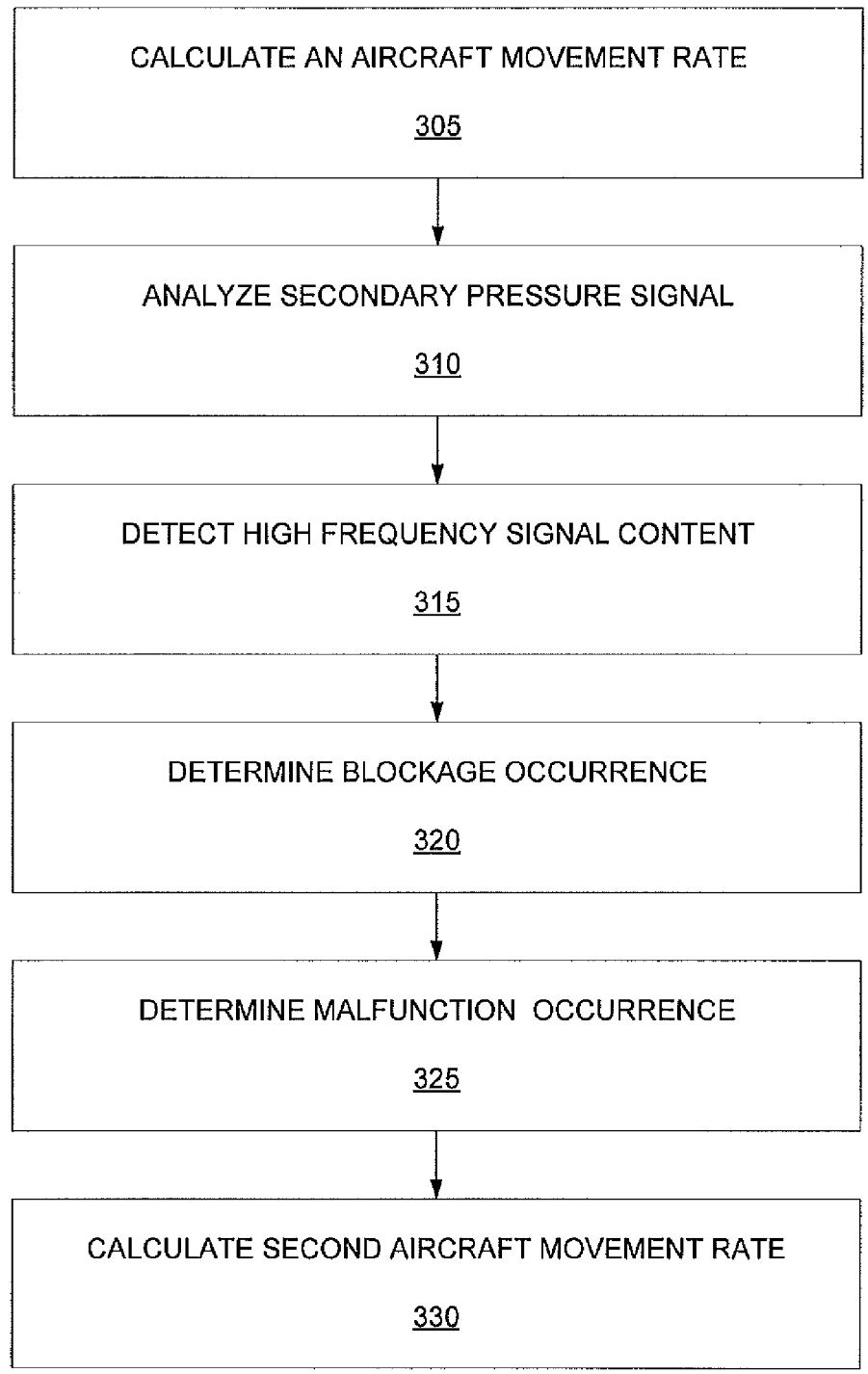
FIG. 3 is a flow diagram illustrating methods of the invention which can be implemented using the pitot-static monitor system shown in FIG. 1.

With reference now to FIG. 3, and in accordance with an illustrated embodiment of the invention, FIG. 3 depicts a block diagram illustrating a method of monitoring a pitot-static avionics system for blockages in accordance with the present invention using a system such as the one described with reference to FIG. 1 and FIGS. 2A and 2B. As shown at block 305, a first aircraft movement rate (e.g., altitude, altitude rate, airspeed and airspeed rate, amongst other determinations) is calculated by air data computer 120 as a function of pressure sensed using the detected air pressure signals of the primary pressure sensors 210, 230 of the aforesaid pitot-static system. At block 310, the air data computer 120 is configured and operable to analyze the detected air pressure signals of the secondary pressure sensors 220, 240, preferably the frequency content and amplitude of the signal from the secondary pressure sensors 220, 240, to determine the presence of a high frequency noise in the pressure signal (block 315). It is to be understood and appreciated that the presence of a high frequency signal content from a secondary sensor 220, 240 is indicative that its associated probe component (pitot tube component 150, static pressure port component 160) is not blocked by ice or other debris. Thus, if the air data computer 120 determines there is no high frequency content from a secondary sensor 220, 240, air data computer 120 determines its associated probe component (pitot tube component 150, static pressure port component 160) is blocked by ice or other debris (block 320). Additionally, at block 325, if the air data computer receives no signals from a primary air pressure sensor 210, 230 but does receive a high frequency noise signal from its associated secondary air pressure sensor 220, 240, the air data computer then determines the primary air pressure sensor 210, 230 providing no signal is faulty and is not blocked by ice or other debris in which event the air data computer 120 is preferably configured and operable to utilize the signal from its associated secondary air pressure sensor 220, 240 to determine the aircraft movement data measurement (e.g., air speed, altitude, etc.) that was to be determined by signal from the now determined faulty primary air pressure sensor 210, 230 (block 330).

In another embodiment of the invention, it is to be understood and appreciated that the air data computer 120 is configured and operable to utilize a high frequency response signal of a secondary air pressure sensor 220, 240 to determine an aircraft movement measurement. Preferably, the determination of such an aircraft movement measurement (e.g., for gust load alleviation) requires a signal from an air pressure sensor having a high frequency signal component, which is typically filtered out in a primary air pressure sensor 210, 230.

Figure 4:
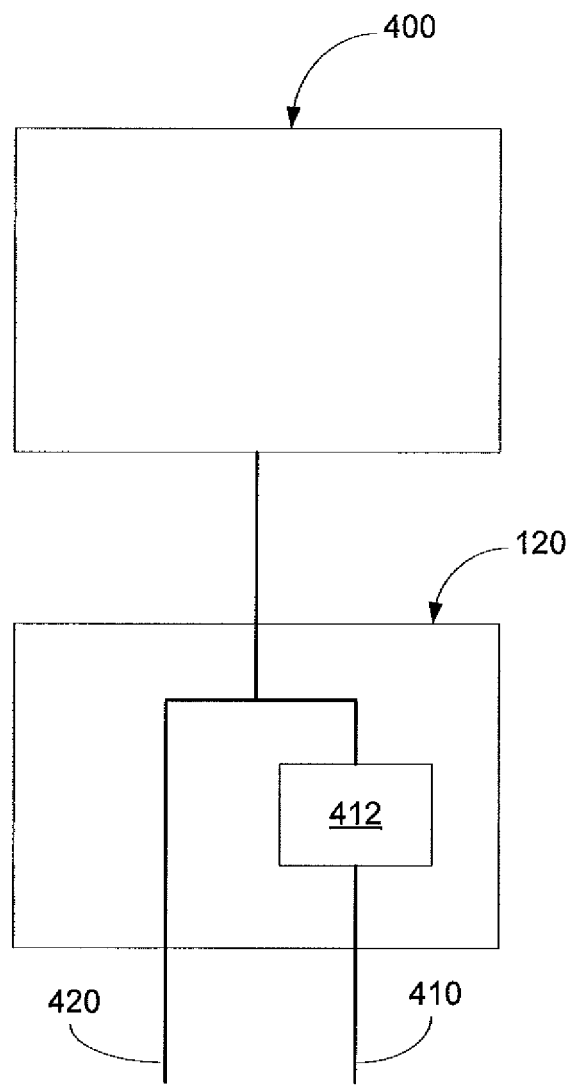
FIG. 4 is a block diagram of portions of the pitot-static monitor system shown in FIG. 1 in accordance with other embodiments of the invention.

In yet another illustrated embodiment of the invention, illustrated in FIG. 4 is an air probe component 400, such as an aforesaid pitot tube component or static pressure port component, wherein the air data computer 120 provides a first electrical signal output 410 that is indicative of the air pressure measurement as detected via the probe component 400 which is filtered by an analog or electronic signal filter 412 to remove high frequency signal components therein. A second electrical signal output 420 is provided by air data computer 120 that is indicative of the air pressure measurement as detected via the probe component 400 which is to preferably include all high frequency signal components. Thus, it is to be appreciated and understood that the first electrical output signal 410 is akin to a filtered air pressure signal provided by an aforesaid primary sensor (210, 230) as described above, and the second electrical output signal is akin to an air pressure signal provided by an aforesaid secondary sensor (220, 240) as also described above. It is to be further understood and appreciated that the above process described with respect to FIG. 3 is to be repeated herein with respect to the first and second electrical output signals (410, 420) as opposed to output from the primary (210, 230) and secondary sensors (220, 240).

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention has been described, it should be understood that various changes, substitutions, and alterations can be made by one of ordinary skill in the art without departing from the scope of the present invention.

What is claimed is:
1. A method of monitoring an avionics system for pneumatic blockages, the method comprising:
    providing a first sensor in association with an air inlet for detecting air pressure, providing a second sensor in association with the air inlet for detecting air pressure, the second sensor having a frequency content higher than the frequency content of the first sensor;

calculating, using a computer coupled to the first and second sensors, aircraft movement data using the detected air pressure from the first sensor; and determining, independently from the calculated aircraft movement data, if the first sensor is faulty or if the air inlet is blocked in dependence upon the frequency content in output from the second sensor; and using the detected air pressure from the second sensor to determine the aircraft movement data when it is determined the first sensor is faulty.

2. A method of monitoring an avionics system as recited in claim 1 wherein the first sensor includes a filter operable to provide a signal from the first sensor having a frequency content suitable for determining aircraft movement data.

3. A method of monitoring an avionics system as recited in claim 1 wherein the air inlet includes a pitot tube.

4. A method of monitoring an avionics system as recited in claim 1 wherein the air inlet includes a static port.

5. A method of monitoring an avionics system as recited in claim 1, wherein the aircraft movement measurement includes airspeed.

6. A method of monitoring an avionics system as recited in claim 1, wherein the aircraft movement measurement is selected from the group consisting of aircraft altitude, angle of attack and angle of sideslip.

7. A method of monitoring an avionics system as recited in claim 1 further including the step of using the detected air pressure from the second sensor to determine a second aircraft movement measurement.

8. A method of monitoring an avionics system as recited in claim 1 wherein the higher frequency content of the second sensor provides a measurement for input to gust load alleviation systems.

9. An avionics system comprising:
an air pressure measurement system including:
a first sensor positioned in association with an air inlet for detecting air pressure, the first sensor having a first frequency response;
a second sensor positioned in association with the air inlet for detecting air pressure, the second sensor having a frequency response higher than the frequency response of the first sensor; and
an air data computer coupled to each first and second sensor operative to calculate a first aircraft movement measurement using the detected air pressure from the first sensor and further operative to determine if the first sensor is faulty or if the air inlet is blocked in dependence upon the frequency content and amplitude of the output from the second sensor,
wherein the air data computer is further operative to use the detected air pressure from the second sensor to determine the first aircraft movement measurement when it is determined the first sensor is faulty.

10. An avionics system as recited in claim 9 wherein the air measurement system further includes a pitot tube providing the air inlet.

11. An avionics system as recited in claim 9 wherein the air measurement system further includes a static port providing the air inlet.

12. An avionics system as recited in claim 9 wherein the aircraft movement measurement includes airspeed.

13. An avionics system as recited in claim 9 wherein the aircraft movement measurement data includes aircraft altitude.

14. An avionics system as recited in claim 9 wherein the air data computer is further operative to use the detected air pressure from the second sensor to determine a second aircraft data measurement.

15. An avionics system as recited in claim 9 wherein the higher frequency response of the second sensor provides a measurement for input to gust load alleviation systems.

16. A method of monitoring an avionics system as recited in claim 1,
wherein the first sensor is positioned in an aircraft and in air flow communication with an air inlet with at least a portion of the air inlet positioned on an external portion of the aircraft for detecting air pressure external of the aircraft, the first sensor having a first frequency response;
wherein the second sensor is positioned in an aircraft and in air flow communication with the air inlet for detecting air pressure external of the aircraft, the second sensor having a frequency response higher than the frequency response of the first sensor;
wherein calculating aircraft movement data further comprising calculating a measurement determination for the aircraft using the computer with the detected air pressure from the first sensor; and
wherein determining if the first sensor is faulty or if the air inlet is blocked further comprising determining in the computer if the first sensor is faulty or if the air inlet is blocked in dependence upon the frequency content and amplitude of the output from the second sensor.

17. An avionics system comprising:
an air pressure measurement system including:
an air probe member;
a sensor operatively coupled to the air probe member providing a first electrical signal indicative of an air pressure measurement from the air probe member and a second electrical signal indicative of an air pressure measurement from the air probe member having a frequency response higher than the frequency response of the first electrical signal; and
an air data computer coupled to each first and second electrical signals operative to calculate an aircraft movement measurement using the first electrical signal and further operative to determine if the air probe member is blocked in dependence upon the frequency content and amplitude of the second electrical signal,
wherein the air data computer uses the second electrical signal to calculate a second aircraft movement measurement.

* * * * *